United States Patent [19]

Benya et al.

[11] 4,013,944
[45] Mar. 22, 1977

[54] PRESSURE INSENSITIVE SYSTEM FOR MEASURING THE LENGTH OF A CABLE DEPLOYED UNDERWATER USING MAGNET ACTUATED REED SWITCHES

[75] Inventors: John A. Benya; Gale W. McGuffey, both of San Diego, Calif.

[73] Assignee: The United States of America as represented by the Secretary of the Navy, Washington, D.C.

[22] Filed: Jan. 2, 1976

[21] Appl. No.: 646,203

[52] U.S. Cl. .......................... 324/34 L; 33/126.6; 235/92 DN; 235/151.32; 335/153; 335/207; 340/347 P

[51] Int. Cl.² ...................................... G01R 33/12

[58] Field of Search ...................... 324/34 R, 34 L; 335/151–154, 205–207; 340/347 P, 3 T, 4 R; 33/126, 126.5, 126.6; 235/92 DN, 151.32; 114/235 B

[56] References Cited

UNITED STATES PATENTS

| | | | |
|---|---|---|---|
| 3,122,735 | 2/1964 | Townsend | 340/347 P |
| 3,268,887 | 8/1966 | Sullivan | 340/347 P |
| 3,558,861 | 1/1971 | Collins | 340/347 P |
| 3,838,518 | 10/1974 | Hendrickson | 33/126.6 |

Primary Examiner—Robert J. Corcoran
Attorney, Agent, or Firm—Richard S. Sciascia; Ervin F. Johnston; Thomas Glenn Keough

[57] ABSTRACT

A pressure insensitive counter for a towed array deployed underwater provides accurate readings of the deployment of the array from a winch. Several magnets are carried on the side of a fairlead sheeve to actuate associated reed switches as the magnets pass by them. The reed switches are oriented with respect to one another to provide binary coded decimal (BCD) signals which are fed to an electronic counter circuit carried inside of a pressurized hull. Mounting the reed switches inside of fluid filled conduits assures that the BCD signals are generated reliably. The electronic counter circuit assures a positive indication of how much of the array has been deployed.

5 Claims, 8 Drawing Figures

PRESSURE INSENSITIVE SYSTEM FOR MEASURING THE LENGTH OF A CABLE DEPLOYED UNDERWATER USING MAGNET ACTUATED REED SWITCHES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Mechanical counters which show how much cable of an elongate hydrophone array has been played out are many and varied in design. However, like all mechanical devices, wear and corrosion affect their reliability. Electromechanical or electronic counters have proven to be more satisfactory, yet they too are susceptible to damage from corrosion, vibration, shock, etc. None of the contemporary measuring devices are adaptable to operate reliably at great ocean depths. Seismic devices with their related instrumentation are being strung out in elongate arrays for data gathering purposes. The location of the several instrumentation packages along the array with respect to a known reference point is necessary to allow a meaningful correlation of the data obtained. Hence, an accurate, reliable counter which tells how much of the array has been played out or reeled in should be provided. Presently, in the state of the art, there is a need for a pressure insensitive counter designed to measure the length of a cable deployed from a submerged winch.

SUMMARY OF THE INVENTION

This invention is directed to providing an apparatus for measuring the length of a cable or elongate array deployed from a submerged winch. A fairlead sheeve which receives the cable from the winch carries a number of small magnets on its side. Several reed switches contained in lengths of fluid filled tubing are actuated as the magnets pass by them to create signals representative of the length of cable deployed. These signals are fed to electronics on the inside of a pressurized hull to give a visual readout.

An object of the invention is to provide a counter for giving an indication of the amount of cable deployed from a winch.

Another object of the invention is to provide a counter capable of operating at great depths in the ocean.

Another object is to provide a counter which is insensitive to ambient pressure variations.

Still another object is to provide a counter which gives an indication of bidirectional winch travel.

Yet another object of the invention is to provide a counter suitable for operation at great depths which has demonstrated unusually high reliability.

These and other objects of the invention will become more readily apparent from the drawings when taken with the ensuing description.

DESCRIPTION OF THE PREFERRED EMBODIMENT

Figure 1:
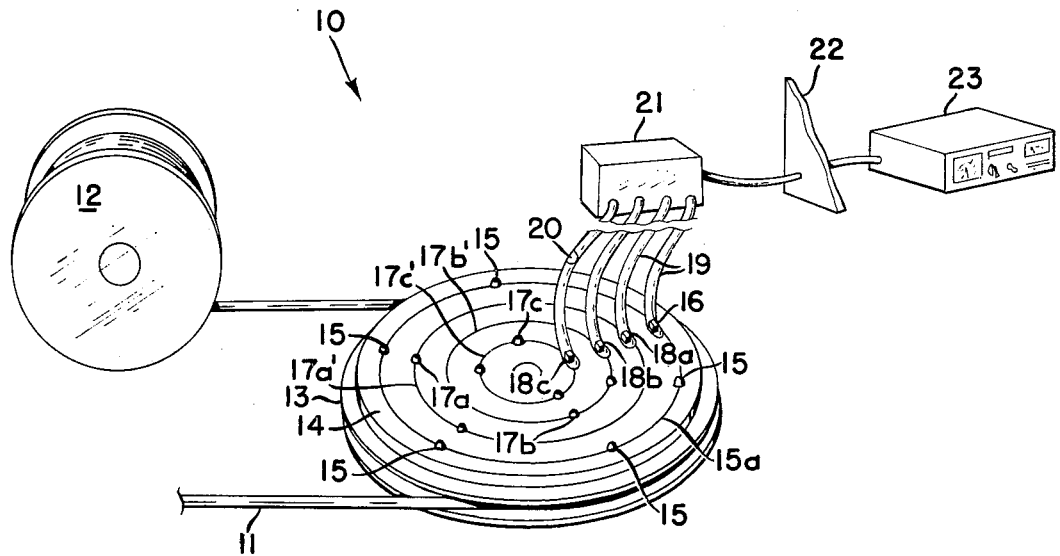
FIG. 1 is an isometric depiction of the invention.

Referring now to FIG. 1, a representative embodiment of a counter 10 functions to measure the amount of a cable or array 11 played out from or reeled onto a winch 12. The array extends from the winch through a fairlead sheave 13 having a grooved outer rim. The fairlead sheave, while guiding the array from the winch to its remote deployment, additionally supports an interconnected plastic or nonmagnetic disc 14. The fairlead sheave is dimensioned to have a known circumference so that as it rotates, say one revolution, a known length of the array passes. In the present instance, and only by way of example, a sheave having a 5 foot circumference was selected.

Five small strobe magnets 15 are mounted on the disc in an equidistantly spaced circumferentially aligned path 15a to correspond to one foot increments of rotation of the fairlead sheave. This arrangement provides strobe signals in a manner to be discussed below for interconnected electronic circuitry.

A reed switch contact 16 is located in a lateral projection of the circumferential path of strobe magnets 15. As strobe magnets passed by the reed switch, the contact is closed five times for each revolution of the fairlead sheave. This produces the strobe signals which will be elaborated on later.

Another group of magnets designated BCD magnets 17a, 17b and 17c is spaced at preestablished intervals along three concentric circles 17a', 17b', 17c' disposed inwardly from path 15a on disk 14. In lateral alignment with each of concentric paths 17a', 17b', or 17c' of the BCD magnets 17a, 17b, and 17c, a reed switch 18a, 18b, or 18c is located. The proximity of reed switches 18a, 18b, and 18c to discrete ones of the BCD magnets is such as to actuate the reed switches when the magnets pass nearby. The BCD magnets are arranged on the surface of the plastic disc to generate a BCD coded output signal representative of a one through five foot passage of array 11 as the fairlead sheave makes one revolution. May it be pointed out that the arrangement of all the magnets optionally is variable to accommodate different coding schemes. The present arrangement was selected primarily because of its demonstrated high reliability.

All of the reed switches 16 and 18 are enclosed in a section of tubing 19 filled with a noncompressionable fluid 20. Leads 16a', 18a', 18b' and 18c' reach from the switches inside the tubing to a junction boxhull penetrator 21 and into the interior of a pressurized hull 22. Inside the hull the leads go to an electronic package 23 where the visual readout is provided.

From the foregoing it is apparent that the sensory elements, i.e. the magnets and the tubing enclosed reed switches, are designed to be insensitive to ambient pressure variations. The otherwise fragile electronics module is safely contained inside the pressurized hull. The described system is therefore quite rugged and capable of reliable operation at extreme depths in the corrosive ocean. The closing of the reed contacts is not impaired by the fluid in the tubing sections and when the magnets pass nearby signals are generated for the electronics package.

Figure 3:
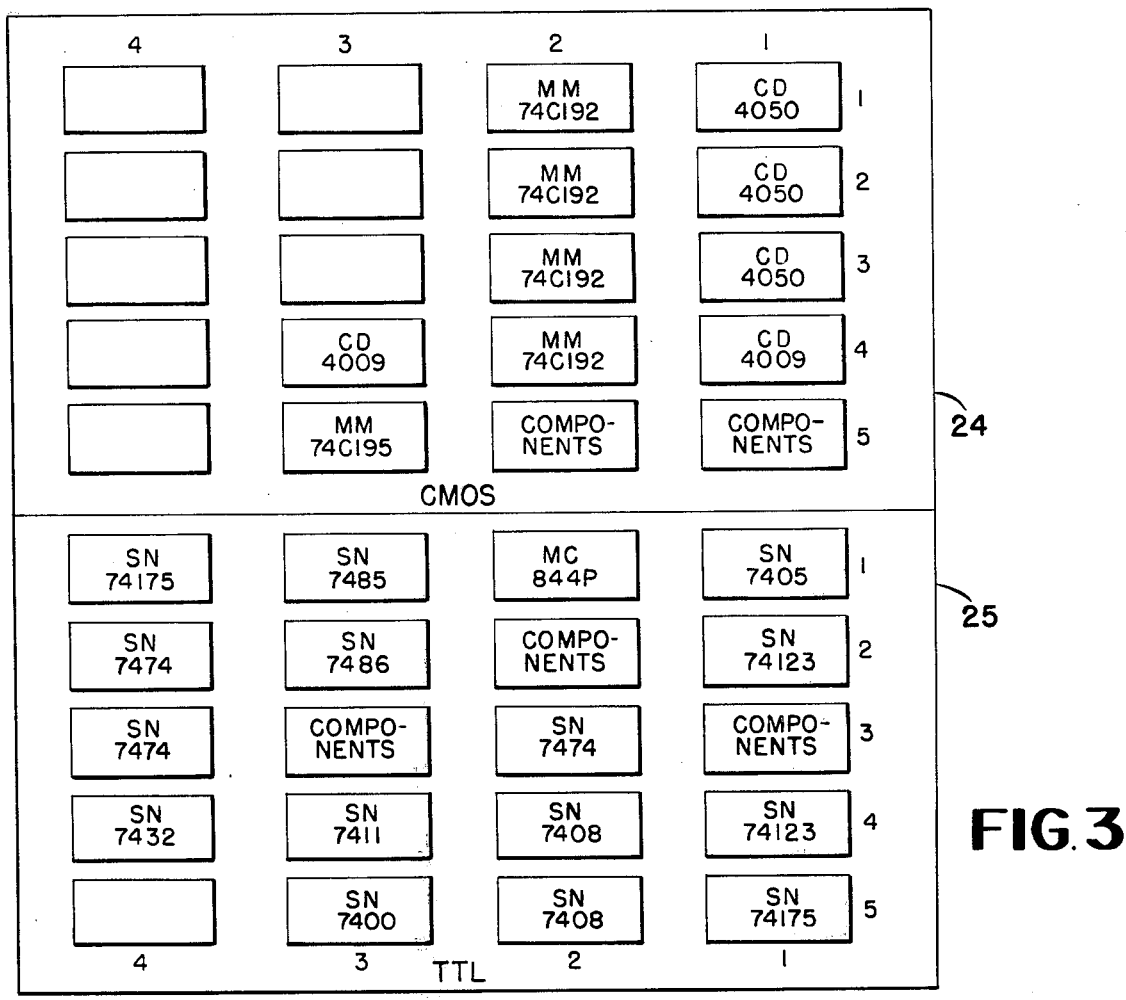
FIG. 3 is a representation of the location of the components of the electronic counter.

One of the unique features of the invention is the circuitry which makes up the electronics module. FIG. 3 depicts a complementary metal oxide semiconductor board (CMOS) 24 and a transistor-transistor logic board (TTL) 25 which appropriately locate integrated circuits to perform counting. In the ensuing description and in the accompanying drawings, the integrated circuits are identified by vertical and horizontal coordinate numbers. For example, looking to FIG. 3 when reference is made to a C, this designates CMOS board 24. A following reference designation 3.5 indicates the integrated circuit four bit register marketed by the National Semiconductor Corporation under the designation MM74C195. Similarly, when reference is made to T 2.5 the TTL board is being designated. The 2.5 draws a reader to the integrated circuit identified as an SN7408 quadruple two-input positive "and" gate circuit marketed by the Texas Instruments Corporation. Throughout the drawings and specification this nomenclature will be followed. TTL board 25 and CMOS board 24 have blank spaces since they weren't all needed by the counter.

Figure 4:
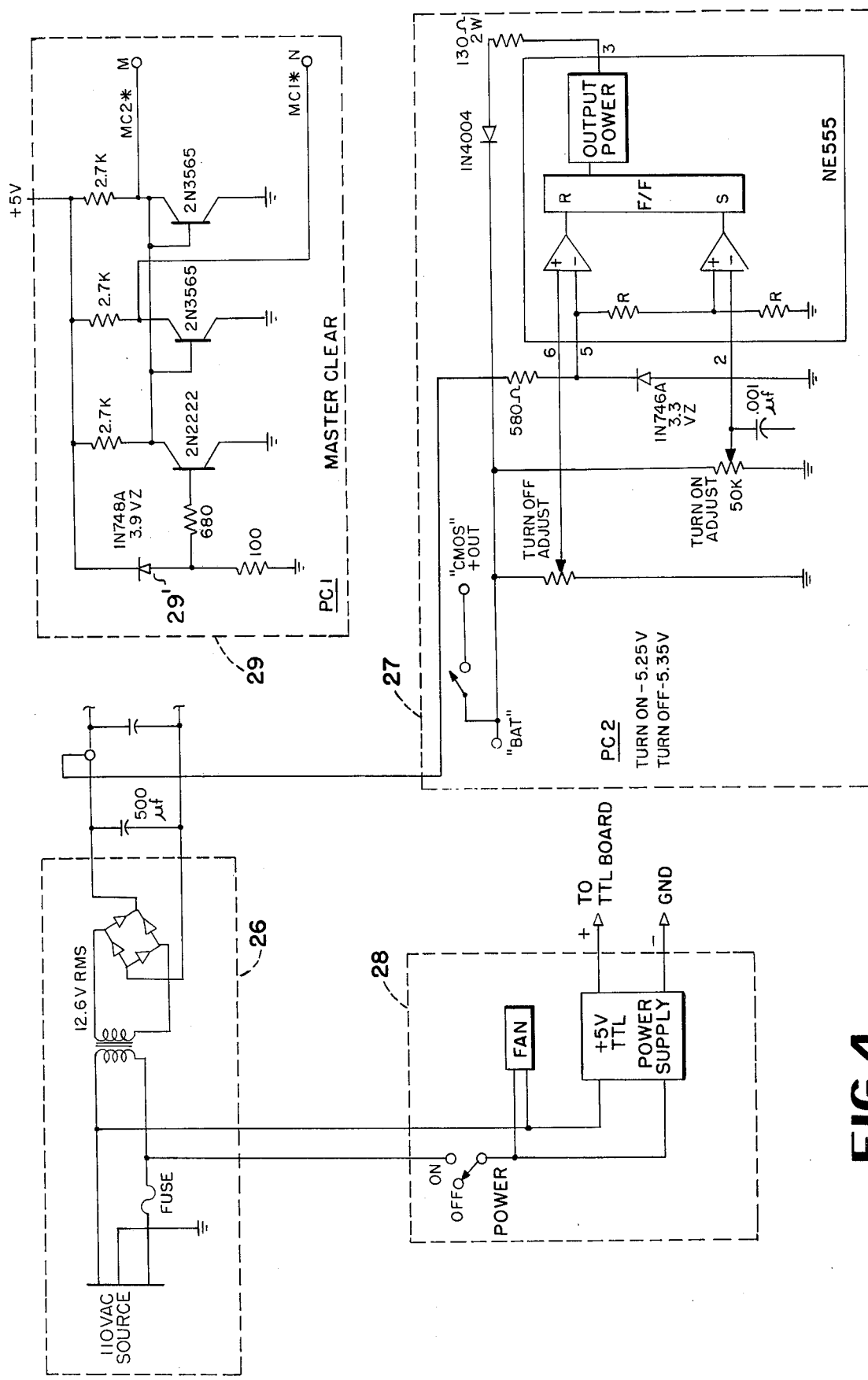
FIG. 4 is a schematic representation of a portion of the counter.

Looking to FIG. 4 an alternating current source through a conventional rectifier circuit 26 ensures that current is supplied to a battery charging circuit 27. This charging circuit is commercially available under the trade designation NE555 and reliably supplies current to CMOS circuit 24.

A commercially available power supply 28 also is connected to the AC voltage source to provide power for the TTL board. The TTL board power supply also feeds power to a master clear circuit 29. The master clear circuit 29 is appropriately designed to provide two outputs designated MC1* and MC2* when the TTL power supply reaches 80% (4.0 volt dc detected by conduction of a zener diode 29 in the master clear circuit). When this condition occurs, the master clear signals MC1* and MC2* go to the high level. In the event of power failure or if it is turned off, the master clear signals, MC1* and MC2* have a short transition to a low level to ensure that spurious signals do not affect counters.

Figure 2:
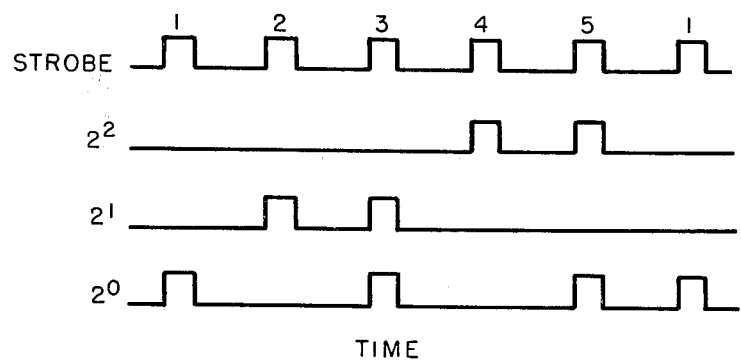
FIG. 2 is a timing sequence.

As referred to above, the signals representative of cable travel originate with the actuation of magnetic reed switches 16 and 18a, 18b, and 18c located beside the disc on the cable fairlead sheave, see FIG. 1. Since the circumferential dimension of the fairlead sheave corresponds to a 5 foot distance and the five small strobe magnets 15 are equally spaced around radius 15a, reed switch 16 is actuated five times per revolution. BCD magnets 17a, 17b and 17c are located to actuate their associated reed switches 18, 18a, 18b, and 18c in a three-bit binary count sequence. The BCD magnets are aligned to produce, see FIG. 2. BCD signals in the duration when a strobe signal is produced.

Figure 5A:
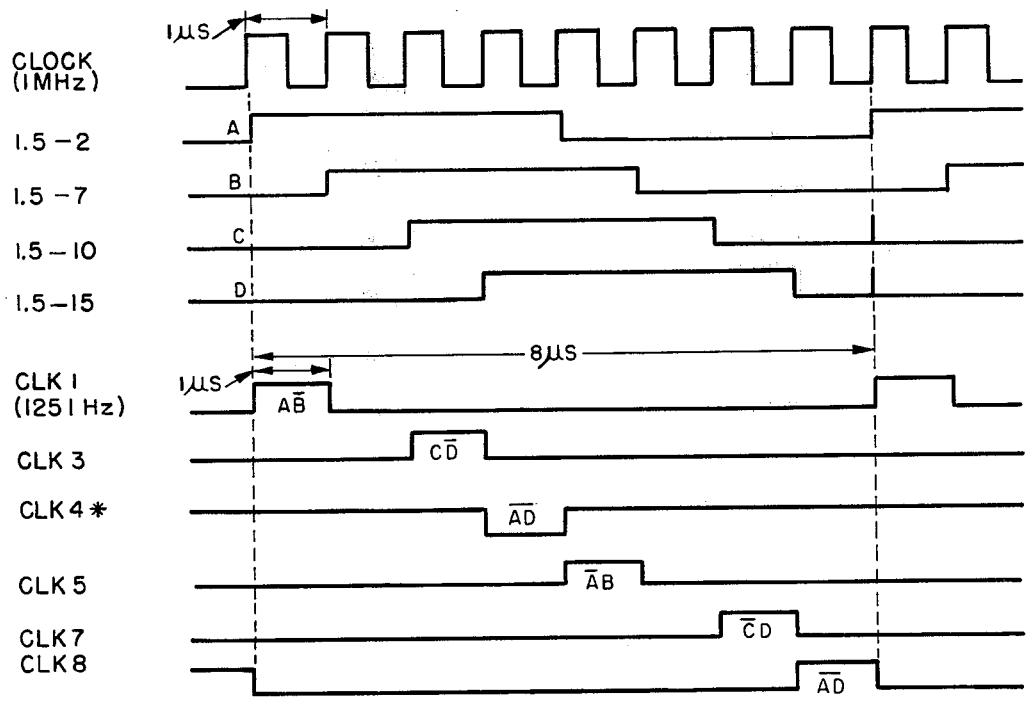
FIG. 5a is the clock timing sequence.
Figure 5:
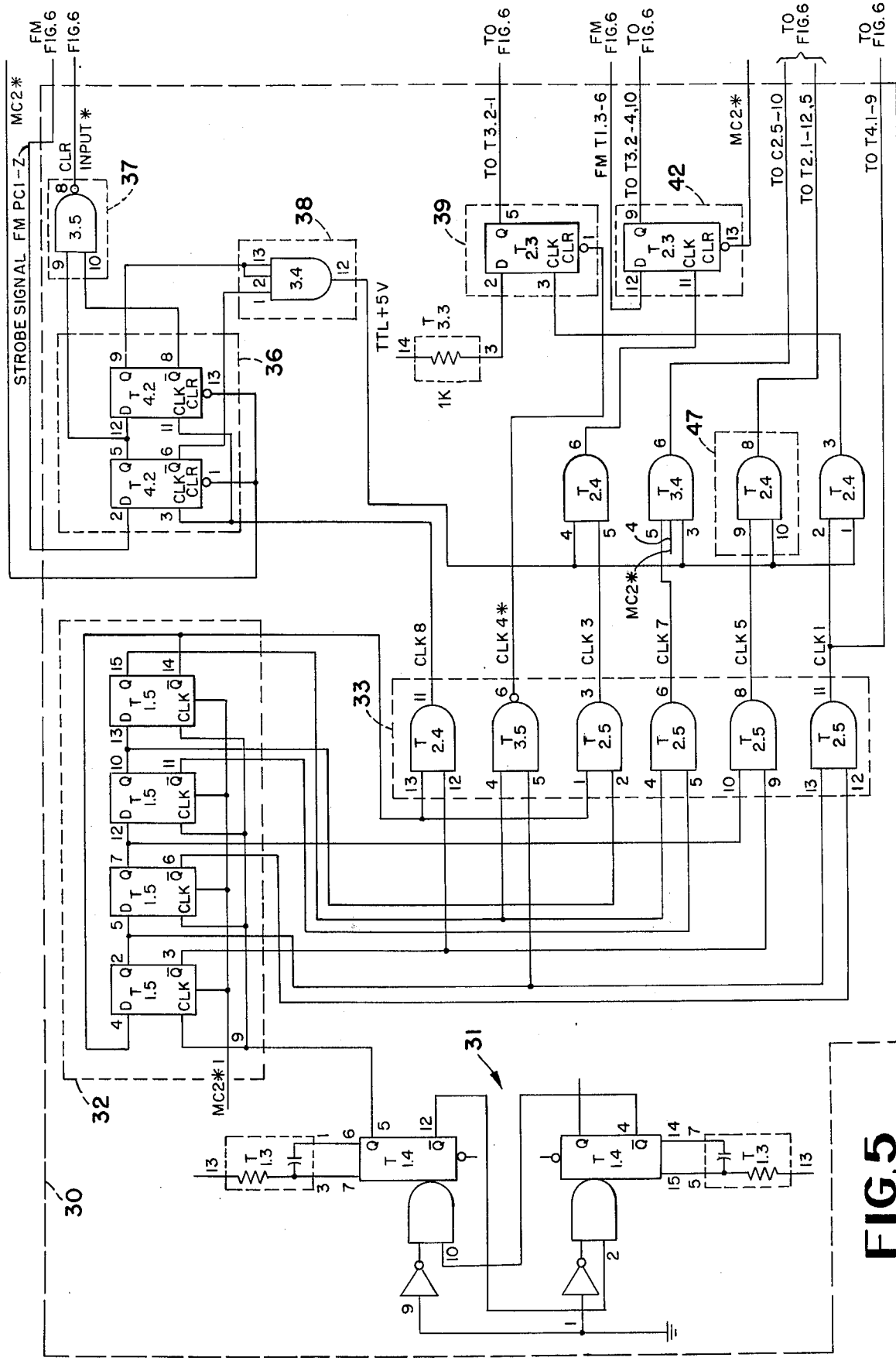
FIG. 5 shows the clock circuits of the counter.

The input and counting signals are synchronized by an eight-phase clock 30. Looking to FIG. 5, the clock includes a retriggerable monostable multivibrator interconnected as a cross-coupled monostable multivibrator 31 which produces a one megahertz square wave. The output of this multivibrator drives a four-stage shift register 32 which has the $\overline{Q}$ output of the last stage connected to the input of the first stage to produce one inversion in the ring. The stages therefore alternately go all high then all low. The shift register may be an SN74175 marketed by Texas Instruments Corporation having the location of 1.5 on the TTL board 25 coupled according to the indicated pin connections in FIG. 5. The outputs from the four stage shift registers are received by a number of two-input gates 33 located on TTL board 25 at locations 2.4, 3.5, and 2.5. Selected outputs from the shift register are decoded with the two input gates 33 at the positions of 2.4 to produce a sequence of one microsecond clock signals during each 8 microseconds, see FIG. 5a.

Figure 6:
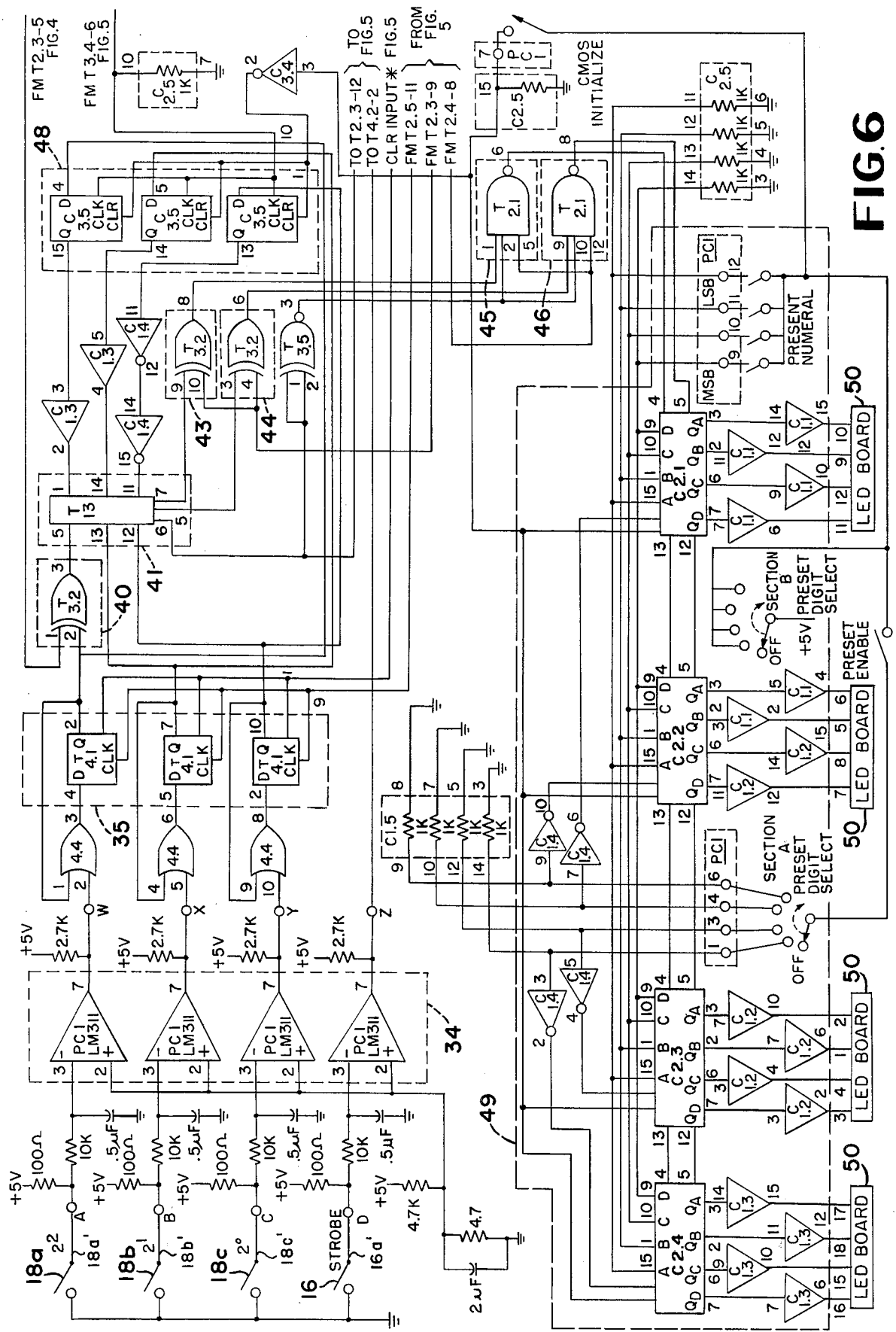
FIG. 6 shows still another portion of the counter.

Referring to FIG. 6, individual ones of a block of comparators 34 detects the transition past, for example, a 2.5 volt reference level and applies a high logic level signal to a latch circuit 35. It is apparent that the signals generated by the reed switches do not begin or end simultaneously. This is largely because of the mechanical variations at the sensors however, the signals are generated at the same intervals. The strobe signal generated by reed switch 16 is used as an interval marker for enabling the detection and processing of the signals generated across reed switches 18a, b, and c, which, as mentioned before, are disposed on disk 14 to present a binary code input.

Figure 7:
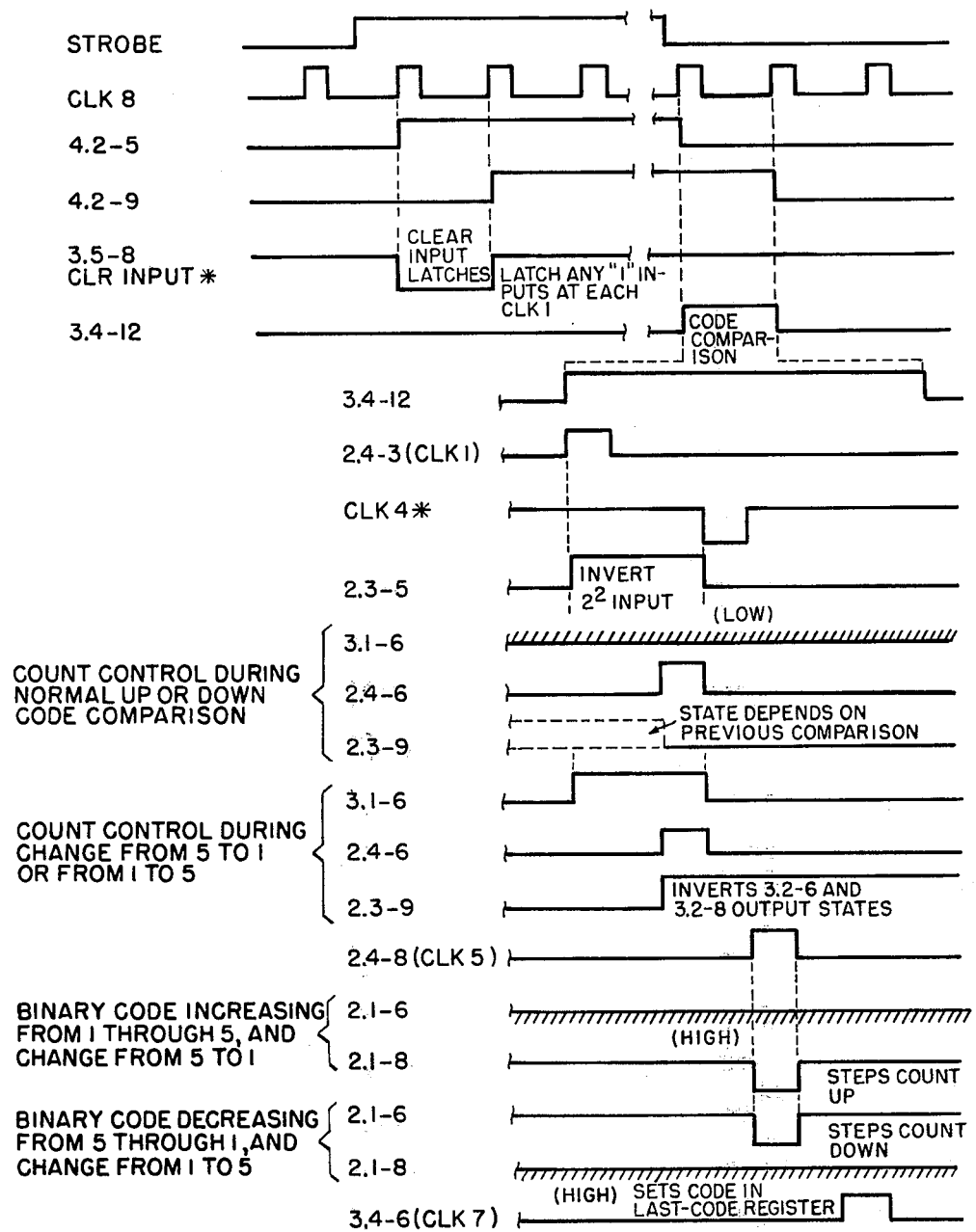
FIG. 7 shows the clock timing sequence.

The synchronization of electronics module 23 with the rotation of the fairlead sheave 13, in part, depends on the closure and grounding of each reed switch 16 and 18a, b, and c. Synchronization is accomplished by using one clock signal (CLK8) to detect the beginning and end of the strobe signal in a two stage shift register 36 as the strobe signal is fed to the register. The timing sequence is shown in FIG. 7.

The strobe signal is fed to the first stage of two stage shift register 36 which is, in turn, triggered by CLK8. When the strobe signal is at its high state, the next two CLK8 pulses change the states of both stages of the two stage shift register. A two input gate 37 detects this interval and passes a low level signal which clears input latch circuit 35. Thereafter, during the duration of the relatively high level strobe input signal, any signals from reed switches 18a, b, and c are fed through comparator stage 34 where they are latched by circuit 35 when each CLK1 pulse occurs.

After a strobe signal goes to its low state indicating that reed switch 16 has opened, CLK8 pulses, the first two CLK8 pulses which are generated after the strobe signal goes to low state, shift this change into both stages of shift register 36 to input gate 38. This enables a sequence of clock pulses to follow to the code processing circuits.

The incoming signals from the reed switches which consist of strobe signals and BCD signals are compared to the previous strobe-BCD signal combination to determine whether the count should be increased or decreased. Normally this combination of signals, or for want of a better term, the input code should increase the total count on a visual display when the binary magnitude increases and a decrease of the input code should decrease the total count. However, the total count should also increase when the BCD signals indicate a change from a binary five to a binary one, that is to say, after the fairlead sheave has made a complete revolution and is beginning a new subsequent revolution.

Contrarily, the total count should be decreased when there is a direct change from BCD signals indicative of a binary one to BCD signals which are indicative of a binary five reflecting a reversal of rotation of the fairlead sheave.

Looking to FIG. 7, and in particular to the representation of the expanded signals in a code comparison slot, a CLK1 pulse actuates flip-flop 39 which results in a sampling for the five-to-one and one-to-five binary count changes. The enabling signals appearing on pin five on flip-flop 39 are fed to an exclusive-or gate 40. This causes an inversion of the most significant bit of the binary code signal inputs. The resulting code and the last code signals stored in latch circuit 35 are compared in a binary magnitude comparator 41. The comparator selected is an SN7400 interconnected as shown.

The two codes, the inverted code and the last input code, will be equal only when the codes are five and one in either order. At equal output from comparator 41 appears at pin 6 and it is stored in flip-flop 42 upon the arrival of a CLK3 pulse. A stored equal signal in flip-flop 42 is fed to a pair of exclusive-or gates 43 and 44 to invert the comparator output signals effectively transposing the signals into two count-pulse gates 45 and 46.

If an equal signal was not stored in flip-flop 42 and not passed along to exclusive-or gates 43 and 44, the code change was a normal increase or decrease in binary magnitude and no inversion is created at the binary magnitude comparator 41 outputs.

A CLK 4* pulse is fed to flip-flop 39 to result in the clearing of an otherwise created inverted signal by exclusive-or circuit 40. This inverted signal would otherwise have been fed to the comparator 41. Now the comparator may process the actual input code and the stored latch code signal.

A CLK 5 pulse then passes through an appropriately enabled gate 47 to produce an "up" count pulse through gate 45 or a "down" pulse through gate 46. This "up" or "down" pulse is passed through a CMOS counter circuit 49 and a CLK 7 pulse transfers the input code into a last code register 48 while a CLK 8 pulse disables the code comparison sequence in two stage shift register 36.

Counter circuit 49 which is an integral extension from the aforedescribed circuitry provides a visual readout 50 of how much of the cable or array has been deployed. Four cascaded CMOS cascade counters mounted in the CMOS board at positions 2.1, 2.2, 2.3, and 2.4 provide driving signals for four light emitting diode (LED) numerical displays 50. As is common in LED displays, each contains an internal decoded driver circuit for transforming the driving signals into representative digits. With the four LED displays coupled as shown in FIG. 6 to the counter circuit 49, deployed cable lengths up to 9,999 feet are possible.

The counter circuit 49 and the last code register 48 optionally are cleared initially by a front panel schematically depicted in FIG. 6.

Obviously, many modifications and variations of the present invention are possible in the light of the above teachings, and, it is therefore understood the invention may be practiced otherwise than as specifically described.

What is claimed is:

1. An apparatus for measuring the length of cable deployed from a winch submerged in water comprising:
    a fairlead sheave disposed in the water to receive the cable directly from the winch having a predetermined grooved circumference for rotatably receiving the cable;
    a plurality of magnets radially mounted on the fairlead sheave for radiating electromagnetic energy;
    a plurality of reed switches disposed adjacent to the magnets to be magnetically actuated by the magnets for thereby providing coded signals representative of the deployed length of the cable;
    a plurality of sections of tubing disposed in the water, each being fluid filled and each containing at least one of the reed switches for ensuring compensation for ambient pressure variations and to assure reliable actuation thereof
    means coupled to the reed switches for presenting a visual readout of the signals; and
    means coupled to the sections of tubing and connecting the reed switches and the presenting means for maintaining a watertight integrity thereacross.

2. An apparatus according to claim 1 in which the magnets and the reed switches are arranged with respect to each other to provide BCD signals representative of bidirectional extension of the fairlead sheave.

3. An apparatus according to claim 2 in which the presenting means includes circuitry interconnected to provide BCD signals indicative of a successive playing out or reeling in of the cable.

4. An apparatus according to claim 3 in which the circuitry includes at least an interconnected shift register and exclusive or gates to indicate the direction of winch travel.

5. An apparatus according to claim 4 in which the circuitry is fabricated from TTL and CMOS boards electronically interconnected for indicating direction and extent of winch travel.

* * * * *